United States Patent [19]

Akkapeddi et al.

[11] Patent Number: 5,210,134
[45] Date of Patent: * May 11, 1993

[54] HIGH IMPACT, STYRENIC POLYMER/THERMOPLASTIC POLYMER GRAFTED BLENDS

[75] Inventors: Murali K. Akkapeddi, Morristown; Bruce VanBuskirk, Dover; Timothy J. Kraft, Pompton Plains, all of N.J.

[73] Assignee: Allied Signal, Morris Township, Morris County

[ * ] Notice: The portion of the term of this patent subsequent to May 19, 2009 has been disclaimed.

[21] Appl. No.: 834,441

[22] Filed: Feb. 12, 1992

Related U.S. Application Data

[60] Division of Ser. No. 587,892, Sep. 25, 1990, Pat. No. 5,115,018, which is a continuation-in-part of Ser. No. 446,893, Dec. 6, 1989, abandoned, which is a division of Ser. No. 262,196, Oct. 19, 1988, Pat. No. 4,902,749, which is a continuation of Ser. No. 88,738, Aug. 24, 1987, abandoned.

[51] Int. Cl.$^5$ .................... C08L 67/02; C08L 55/02; C08L 51/04
[52] U.S. Cl. ..................... 525/64; 525/166; 525/176
[58] Field of Search ............ 525/64, 166, 176

[56] References Cited

U.S. PATENT DOCUMENTS

3,134,746  6/1961  Grabowski .
(List continued on next page.)

FOREIGN PATENT DOCUMENTS

| | | |
|---|---|---|
| 21303 | 1/1981 | European Pat. Off. . |
| 202214 | 11/1986 | European Pat. Off. . |
| 1147484 | 11/1957 | France . |
| 60-137961 | 7/1985 | Japan . |
| 62-81444 | 4/1987 | Japan . |
| 1250877 | 10/1971 | United Kingdom . |

OTHER PUBLICATIONS

"Copolyamides of Caprolactam and m-xyleneciammonium Iso", *J. Appl. Polymer Science* 20, 3185 (1976).

"Effect of Composition on the Mechanical Properties of Blends of the Copolymer ABS with Polyamides", *J. Appl. Polymer Science* 25, 2493 (1980).

"Blends of Modified ABS with Polyamides", *Antec* 1986, 324.

"New Nylon/ABS Alloys: Structure-Property Relationships, Part 1", *Antec* 1987, 1369.

Comline News Service, Mar. 30, 1988.

*Primary Examiner*—David J. Buttner
*Attorney, Agent, or Firm*—Melanie L. Brown; Roger H. Criss

[57] ABSTRACT

A modified styrenic polymer is described, which comprises the reaction product of said polymer with an ethylenically unsaturated grafting agent having the formula:

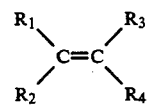

wherein one to three of $R_1$, $R_2$, $R_3$ and $R_4$ are moieties containing reactive groups selected from carboxylic acid, acid anhydride, acid amide, imido, carboxylic ester, amino, hydroxyl, epoxy, isocyanate, carbamate, carbamoyl lactam, acyl lactam, pyridyl, 1,3-oxazoline, 1,3 oxazine, oxazolone, oxazinones, and any derivatives, combinations and mixtures thereof; and wherein the remaining one to three of $R_1$, $R_2$, $R_3$ and $R_4$ are H or a hydrocarbon radical of from about 1 to about 20 carbon atoms; said modified styrenic polymer containing said reactive groups as pendant reactive functionalities.

The claimed composition comprises:
A) maleated ABS
B) polyester
C) optionally ethylene copolymer rubber.

11 Claims, No Drawings

U.S. PATENT DOCUMENTS

| | | |
|---|---|---|
| 3,386,964 | 6/1968 | Twilley . |
| 3,435,093 | 3/1969 | Cope . |
| 3,661,866 | 5/1972 | Schwarz . |
| 3,794,625 | 2/1974 | Anderson et al. . |
| 3,962,524 | 6/1976 | Miyamoto et al. . |
| 3,968,071 | 7/1976 | Miyamoto et al. . |
| 3,974,234 | 8/1976 | Brinkmann et al. . |
| 4,013,613 | 3/1977 | Abolins et al. . |
| 4,018,746 | 4/1977 | Brinkmann et al. . |
| 4,086,300 | 4/1978 | Owens et al. . |
| 4,097,446 | 6/1978 | Abolins et al. . |
| 4,098,860 | 7/1978 | Etou et al. . |
| 4,133,802 | 1/1979 | Hachiboshi et al. . |
| 4,174,358 | 11/1979 | Epstein . |
| 4,292,233 | 9/1981 | Binsack . |
| 4,381,371 | 4/1983 | Nielinger et al. . |
| 4,398,642 | 8/1983 | Okudaira et al. . |
| 4,404,317 | 9/1983 | Epstein et al. . |
| 4,427,828 | 1/1984 | Hergenrother et al. . |
| 4,429,076 | 1/1984 | Saito . |
| 4,442,254 | 4/1984 | Aratani . |
| 4,496,690 | 1/1985 | Grant et al. . |
| 4,500,668 | 2/1985 | Shimizu et al. . |
| 4,537,929 | 8/1985 | Nangrani . |
| 4,628,072 | 12/1986 | Shiraki . |
| 4,657,970 | 4/1987 | Shiraki . |
| 4,740,552 | 4/1988 | Grant . |
| 4,783,503 | 11/1988 | Gergen . |
| 4,795,782 | 1/1989 | Lutz . |
| 4,871,799 | 10/1989 | Kobayashi . |
| 5,115,018 | 5/1992 | Akkapeddi ............................ 525/64 |

HIGH IMPACT, STYRENIC POLYMER/THERMOPLASTIC POLYMER GRAFTED BLENDS

This application is a division of the application Ser. No. 587,892, filed Sep. 25, 1990 now U.S. Pat. No. 5,115,018, which is a continuation-in-part of Ser. No. 446,893 filed Dec. 6, 1989 (abandoned which is a divisional of Ser. No. 262,196 filed Oct. 19, 1988 (U.S. Pat. No. 4,902,749) which is a continuation of Ser. No. 088,738 filed Aug. 24, 1987 (abandoned).

FIELD OF THE INVENTION

This invention relates to styrenic polymers modified with ethylenically unsaturated graft linking agents, the methods to achieve such modification, and compositions containing the modified styrenic polymers, especially styrenic polymer/thermoplastic grafted blends.

BACKGROUND OF THE INVENTION

Styrenic polymers such as ABS are known to be immiscible with thermoplastic semicrystalline polymers such as polyamides, Particularly in the blend ratios of interest ranging from 1:9 to 9:1 (see e.g. Y.V. Lebedev, et al, J. Applied Polymer Science 25. 2493, 1980).

Due to this mutual incompatibility, simple mechanical blends of ABS and semicrystalline thermoplastic polymer such as nylon 6 tend to be brittle and readily delaminate when the molded parts are flexed or twisted. U.S. Pat. No. 4,496,690 discloses compositions of modified ABS and nylon blends in which the ABS portion was significantly modified through copolymerization with as much as 10% acrylamide monomer units to obtain useful levels of compatibility and properties.

European Patent Application #202214 (1986) teaches the use of styrene-acrylonitrile-maleic anhydride terpolymers as compatibilizers for ABS-nylon blends.

COMLINE NEWS SERVICE, Mar. 30, 1988, carried an announcement of a polymer alloy of acrylonitrile-butadiene-styrene and polybutylene terephthalate resin.

Dylark (registered trademark) DPN-500 is an alloy of styrene maleic anhydride and polybutylene terephthalate.

SUMMARY OF THE INVENTION

The present invention provides a modified styrenic polymer comprising the reaction product of said polymer with an ethylenically unsaturated grafting agent having the formula:

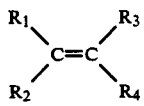

wherein one to three of $R_1$, $R_2$, $R_3$ and $R_4$ are moieties containing reactive groups selected from carboxylic acid, acid anhydride, acid amide, imido, carboxylic ester, amino, hydroxyl, epoxy, isocyanate, carbamate, carbamoyl lactam, acyl lactam, pyridyl, 1,3-oxazoline, 1,3 oxazine, oxazolone, oxazinones, and any derivatives, combinations and mixtures thereof;

and wherein the remaining one to three of $R_1$, $R_2$, $R_3$ and $R_4$ are H or a hydrocarbon radical of from about 1 to about 20 carbon atoms; said modified styrenic polymer containing said reactive groups as pendant reactive functionalities.

The present invention also includes a melt blended composition comprising the reaction product as recited above and a thermoplastic polymer which is reactive with pendant reactive functionalities of the reaction product.

The composition of the modified styrenic polymers and the thermoplastic polymer optionally and preferably contains from about 5 to 50 percent by weight of an elastomeric polymer.

The present invention also includes methods of making the reaction product and compositions containing the reaction product. The compositions of the present invention can be prepared by conventional polymer melt blending techniques. This method is typically conducted at a temperature above the melting temperature of the polymeric additives in a closed mixing device such as an extruder. The method preferably first comprises melt blending the styrenic polymers and the grafting agent to form a reaction product. The reaction product is then melt blended with the thermoplastic polymer which is reactive with the reactive groups of the reaction product.

It has been found that in the preferred embodiments, the first method results in a reaction product which can also be called a modified or functionalized styrenic polymer. The second method or second step is a method to make a composition of this reaction product or modified styrenic polymer and a thermoplastic polymer. This two-step method produces a composition with improved tensile elongation properties.

DETAILED DESCRIPTION OF THE INVENTION

Styrenic polymers suitable for modification according to the present invention are those having at least about 25% by weight of the polymer units derived from a vinyl aromatic compound of the formula:

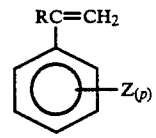

wherein R is hydrogen, (lower) alkyl or halogen, Z is vinyl, halogen or (lower) alkyl, and P is 0 or an integer of from 1 to the number of replaceable hydrogen atoms on the benzene nucleus. Herein, the term "(lower) alkyl" is intended to mean alkyl of from about 1 to 6 carbon atoms.

The term "styrenic polymers" as used broadly throughout this disclosure and the appended claims includes, homopolymers and copolymers of styrene and includes both rigid resins and those commonly referred to as high impact styrenic resins. The latter refers to resins such as those prepared by graft polymerization of styrene and optionally one or more of copolymerizable vinyl monomers in the presence of an elastomeric polymer substrate, as well as resins prepared by blending a rigid styrenic matrix polymer with a grafted rubbery substrate. Examples include polystyrene, polychlorostyrene and polybromostyrene, as well as high impact polystyrenes, which have been modified by a natural or synthetic rubber, e.g. polybutadiene, polyisoprene, butyl rubber, ethylene-propylene diene copolymers- (EPDM rubber), ethylene-propylene copolymers, natural rubbers, acrylate rubbers, polysulfide rubbers, polyurethane rubbers, styrene-butadiene rubbers (SBR), and the like. Examples of styrene copolymers include both rigid and rubber modified copolymers of styrene with comonomers selected from alpha-methyl styrene, halostyrenes, vinyl alkyl benzenes, acrylonitrile, methacrylonitrile, acrylates and methacrylate esters of lower alcohols etc. The rubber modified copolymers include polybutadiene modified styrene-acrylonitrile resins (ABS), acrylate elastomer modified SAN (ASA) EP or EPDM rubber grafted SAN copolymer, (OSA such as Rovel(registered trademark), Dow) styrene-butadiene, chlorinated Polyethylene, modified, styrene-acrylonitrile copolymer, (ACS), styrene-isoprene block copolymers and hydrogenated products thereof (e.g. Kraton(registered trademark)).

The modification of the styrene polymers of the invention is accomplished by attaching an unsaturated grafting agent to the styrenic polymer backbone, resulting in a pendant functionality. The grafting agent has a first functional group, the ethylenically unsaturated double bond, which is reactive with the styrenic polymer, and one or more second functional group, designated $R_1$–$R_4$, that will be reactive with a polymer having reactive groups such as hydroxy, amine, and the like, particularly when such groups are end groups. The grafting agent may be represented by the general formula:

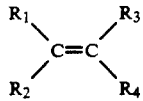

wherein one or more of the second functional groups are moieties containing reactive groups selected from carboxylic acid, acid anhydride, acid amide, imido, carboxylic ester, amine, hydroxyl, epoxy groups, isocyanates, carbamates, acyl lactams, pyridyl, 1,3 oxazoline, 1,3 oxazines, oxazolones, oxazinones, and combinations, mixtures and derivatives thereof.

Grafting agents comprising an ethylenically unsaturated double bond and the second functional group may be reacted with the styrenic polymer by themselves, or in a mixture with a readily available monomer to act as a diluent. Vinyl monomers such as styrene, methyl methacrylates, and the like are particularly suited for this last-mentioned purpose. Additionally, the grafting agent may be attached to a carrier molecule such as an oligomer that is compatible with all or a portion of the styrenic polymer it is desired to modify. Particularly suitable oligomers are liquid polybutadiene, hydrogenated polybutadiene, polystyrene-polybutadiene block copolymers polyethers and the like.

Illustrative of grafting agents suitable for use within the context of the present invention are maleic anhydride, fumaric acid, monoalkyl, esters of maleic acid, monoalkyl esters of fumaric acid, acrylic acid, methacrylic acid and corresponding esters, methacryloyl or acryloyl caprolactam, methacryloyl or acryloyl laurolactam, isopropenyl oxazoline, vinyl oxazolone, vinyl pyridine, glycidyl acrylate, glycidyl methacrylate, diglycidyl fumarate and the like, whether alone or in any combination.

Preferred among these grafting agents are maleic anhydride, fumaric acid, acrylic acids and corresponding esters, acryloyl and methacryloyl lactams, glycidyl acrylate and methacrylates, 2-isopropenyl, 1,3 oxazoline, vinyl pyridine and the like.

In some preferred embodiments, rubbery high molecular weight materials are added to the styrenic polymers to improve the overall impact resistance. This may take the form of conventional rubber dispersions, added prior to or during blending with other polymers. However, the present inventors have found that it is preferable to have the rubbery materials prefunctionalized. Addition of such rubbers to the modified styrenic polymers serves to improve properties obtained when the modified styrenic polymers are then graft blended with one or more second polymers having terminal reactive end groups or pendant groups. This is particularly evident when the styrenic polymers are blended with polyamides. For example, the present inventors have discovered that the notched Izod of the final blends could be substantially improved, while retaining a high elongation to break. The present inventors do not wish to be bound by theory, however, it is postulated that the inclusion of the functionalized olefins may actually toughen the styrenic thermoplastic polymer/second polymer interface.

Suitable rubbery polymers within the context of those described above are defined as having an ASTM D-638 tensile modulus of less than about 40,000, typically less than 25,000, and preferably less than 20,000. They can be homopolymers random, block or graft copolymers. Useful rubbery polymers can be made from reactive monomers which can be part of the polymer chains or branches, or grafted on to the polymer. These reactive monomers can include dienes, and carboxylic acids and derivatives thereof such as esters and anhydrides. Such rubbery polymers include butadiene polymers, butadiene/styrene copolymers, isoprene, chloroprene, acrylonitrile/butadiene copolymers, isobutylene, isobutylene/butadiene copolymers, ethylene/propylene copolymers, ethylene/glycidyl methacrylate copolymers, ethylene/propylene/diene terpolymers and ethylene/ethylacrylate/glycidyl methacrylate terpolymer etc. Useful rubbery Polymers can include aromatic vinyl monomers, olefins, acrylic acid and methacrylic acid and their derivatives, ethylene-propylene diene monomers and metal salts thereof. Useful rubbery polymers are disclosed in U.S. Pat. No. 4,315,086 and 4,174,358 both hereby incorporated by reference.

The preferred rubber in the context of the present invention includes a functionalized rubber which is either a random or graft copolymer of ethylene and an alpha-olefin other than ethylene, having a functionality such as carboxyl, anhydride, or epoxide.

The carboxyl or carboxylate functionality, can be supplied or reacting the ethylene/$C_3$–$C_6$ alpha-olefin copolymer with an unsaturated graft moiety taken from the class consisting of alpha,beta-ethylenically unsaturated dicarboxylic acids having from 4 to 8 carbon atoms, or derivatives thereof. Such derivatives include anhydrides of the dicarboxylic acids, or the metal salts of the acids, or the monoester of the dicarboxylic acid having from 0 to 100 percent of the carboxylic acid groups ionized by neutralization with metal basic salt, and the like. Illustrative of such acids and derivatives are maleic acid, maleic anhydride, maleic acid monoethyl ester, metal salts of maleic acid monoethyl ester, fumaric acid, fumaric acid monoethyl ester, itaconic acid, vinyl benzoic acid, vinyl phthalic acid, metal salts of fumaric acid monoethyl ester, monoesters and maleic or fumaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The graft moiety can be grafted to the ethylene copolymer by any well-known grafting process.

A useful copolymer of ethylene and an alpha-olefin contains from 30 to 60 and preferably 40 to 45 weight percent of the alpha-olefin based on the ethylene. The copolymer also contains from 0.1 to 9 percent, and preferably 0.1 to 4 percent, and more preferably 0.3 to 2.0 percent by weight of the graft moiety. The graft copolymer has a number average molecular weight of from 2,000 to 100,000 preferably 2,000 to 65,000, more preferably 5,000 to 35,000, and most preferably 5,000 to 20,000. Typical values of reduced solution viscosity (RSV) are from 0.5 to 3.5. A RSV of 2.8 corresponds to a number average molecular weight of about 80,000 and a RSV of 10 corresponds to a number average molecular weight of 12,000.

Another useful ethylene is ethylene/glycidyl methacrylate or ethylene/ethylacrylate/glycidyl methacrylate terpolymer.

The modified styrenic polymers of the invention are especially suitable for blending with second polymers that have reactive groups such as amine, hydroxyl, and carboxyl groups, as end groups or groups that are pendant to the polymer backbone. The present inventors do not wish to be bound by theory, however, they have found that the ethylenically unsaturated grafting agents of the present inventions can be used as effective graft linking agents, due to their dual reactivity. This is by way of a reaction mechanism of attachment of the functionality to the styrenic polymer backbone through the ethylenically unsaturated double bond. The grafting agents are then also highly effective in reacting with reactive groups of the second polymer through their second functional moiety. It is believed that the resulting modified styrenic Polymer contains the functionalities attached as pendant units, as opposed to the introduction of such units in the Polymer backbone through copolymerization techniques which results in copolymers such as exemplified by various conventional styrene-maleic anhydride copolymers (e.g. Dylark(registered trademark), Arco). It is believed that such pendant units offer more rotational freedom, and consequently better reactivity, as compared to the more restricted functionalized copolymers. Surprisingly, the result is a grafted link that is stable, especially thermally, to permit extruder processing.

Of the polymers having reactive groups, and are suitable for blending with the modified styrenic polymers, may be mentioned functionalized polyolefins, polyesters, polyamides, and the like, whether alone or in any combination, including mixtures thereof. Particularly preferred for blending with the functionalized styrenic polymers of the invention are the polyamides and polyesters.

Polyamides suitable for use herein include the long chain polymeric amides having recurring amide groups as part of the polymer backbone and preferably having a number average molecule weight, as measured by end group titration of about 15,000 to 40,000. The polyamides suitable for use herein can be produced by any conventional process known in the art.

Non-limiting examples of such polyamides are: (a) those prepared by the polymerization of lactams, preferably epsilon-caprolactam (nylon 6); (b) those prepared by the condensation of a diamine with a dibasic acid, preferably the condensation of hexamethylene diamine with adipic acid (nylon 6,6) and the condensation of hexamethylene diamine with sebacic acid (nylon 6,10), the condensation of hexamethylene diamine with terephthalic and isophthalic acids tetramethylene-diamine with adipic acid (nylon 4,6), and the condensation of metaxylylene diamine with adipic acid and/or terephthalic/isophthalic acid and/or epsilon caprolactam; and those prepared by self-condensation of amino acids, preferably self-condensation of 11-amino-undecanoic acid (nylon-11); or random, block, or graft interpolymers consisting of two or more of these polyamides. Preferred are those obtained by the polymerization of epsilon-caprolactam.

Polyamides such a nylon-6 or nylon 6,6 can contain a variety of terminal functionalities, including (a) a carboxyl group attached to both ends of the polyamide chain; (b) a carboxyl group attached to one end and an amide group attached to the other end of the polyamide chain (the "capped" end) (only Polylactams); (c) an amino group attached to both ends of the polyamide chain; (d) a carboxyl group attached to one end and an amine group attached to the other end of the polyamide chain (only polylactams); and mixtures thereof.

Polyamides having "excess" amine termination are polyamides having molecules with more than 50 mole percent and preferably 60 to 97 mole present of its end groups as amino end groups. Amine end group termination is typically produced by including an excess of diamines during polymerization. A preferred diamine is hexamethylene diamine.

Other examples of diamines suitable for use herein include tetramethylene diamine, pentamethylene diamine, octamethylene diamine, decamethylene diamine, and 1,12 diamines dodecane. The amount of diamine needed to produce the excess amino terminated polyamides of the present invention varies depending on the amount of amine desired and the molecule weight of the resulting Polymer and can be easily determined by one skilled in the art. For example, about 0.25 mole percent of hexamethylene diamine is required to produce a polyepsiloncaprolactam of about 21,000 number average molecular weight having about 80 equivalents/$10^6$g amino end groups and about 17 equivalents/$10^6$g acid end groups.

Similarly, polyamides having more than 50 mole percent of the end groups as acid end groups can be formed by having an excess of diacids such as sebacic acid present over diamines during polymerization. Such polyamides are considered acid terminated polyamides. Useful diacids include but are not limited to oxalic acid, malonic acid, succinic acid, glutaric acid, adipic acid, pimelic acid, suberic acid, azelic acid, and sebacic acid as noted.

Polyesters useful for blending with the modified styrenic polymers of the invention include linear, saturated polyesters of aromatic dicarboxylic acids. The preferred linear saturated polyesters include polyethylene terephthalate, poly(butylene terephthalate), and poly(1,4-cyclohexane dimethylene terephthalate), with poly(ethylene terephthalate) being most preferred due to the low molding temperatures possible. The poly(ethylene terephthalate) for use with the present invention has an intrinsic viscosity range between about 0.4 and about 1.20, with a preferred intrinsic viscosity range between about 0.45 and 0.6. Intrinsic viscosity is obtained by extrapolation of viscosity values to zero concentration of solutions of poly(ethylene terephthalate) in 60 to 40 weight/volume ratio of phenol and tetrachloroethane. The measurements are normalized to 25° C. The poly (ethylene terephthalate) melts between about 250° C. and 275° C. The poly(ethylene terephthalate) can contain minor amounts, up to 5%, of other comonomers such as 1,4 cyclohexanedimethanol, burylenediol, neopentylendiol, diethylene glycol, or glutaric acid.

Functionalized polyolefins useful in the present invention are carboxylated polypropylene (Polybond-(registered trademark) from BP Chemicals), maleated Polypropylene, (Plexar(registered trademark), Chemplex) ethylene-acrylic acid copolymer, ethylene-methacrylic acid copolymer and ethylene vinyl alcohol copolymer and the like.

Preferred compositions of the present invention contain from about 5 to 50 percent of the modified styrenic polymer, more preferably from about 5 to 30 percent.

The styrenic polymer/thermoplastic polymer blends of this invention may also contain one or more conventional additives such as stabilizers and inhibitors of oxidative, thermal, and ultraviolet light degradation, lubricants and mold release agents, colorants, including dyes and pigments, flame retardants, fibrous and particulate fillers and reinforcements, plasticizers, and the like. These additives are preferably added during the blending of the modified styrenic polymer with the second thermoplastic polymer.

Representative oxidative and thermal stabilizers which may be present in blends of the present invention include Group I metal halides, such as sodium, potassium, lithium, cuprous halides, such as chloride, bromide, iodide; hindered phenols, hydroquinones, and varieties of substituted members of those groups and combinations thereof.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like. Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether, brominated polystyrene, and the like.

Representative plasticizers include lactams such as caprolactam and lauryl lactam, sulfonamides such as o,p-toluenesulfonamide and N-ethyl, o,p-toluenesulfonamide and other plasticizers known in the art.

In the method of the present invention, a reaction product is formed by contacting the styrenic polymer with the grafting agent, using conventional techniques such as heating in a solvent medium, melt-blending, and the like. Particularly preferred are melt-blending techniques such as high shear mixing in a Farrell continuous mixer, mixing either in a rubbery state or molten state using extruder processing. The present inventors have discovered that the graft linking of the present invention is particularly suited for extruder processing, and thus, extruder processing techniques and the like are particularly preferred.

When conventional melt-blending techniques are utilized, it is preferable that they be performed in a closed mixing device, such as an extruder, for a time sufficient to allow a reaction to occur between the grafting agent and the polymer. Temperatures that may be utilized vary according to the properties of the components employed, but are typically at above the melting temperature of the polymer components, but below temperatures that lead to degradation of the components. Typical extruder processing temperatures range from about 150° C. to about 300° C, particularly preferred, however, are temperatures of about 180° C to about 270° C.

An effective amount of grafting agent useful to functionalize the styrenic resin may vary widely depending on the particular styrenic polymer and grafting agent utilized as well as the desired characteristics of the resulting reaction product. In some preferred embodiments, the amount of grafting agent can range from about 0.1-20% by wt., based on the weight of the polymer to be modified, and preferably from about 0.2 to about 10% by wt.

In some embodiments of the method of the present invention, the styrenic polymer may be melt-blended with the grafting agent using conditions which are severe enough for a satisfactory reaction to occur without the necessity of adding a free radical catalyst. The resulting reaction product need not be the complete reaction of the styrenic polymer with the grafting agent. It is necessary only that a sufficient amount of reaction occur between the polymer and the grafting agent so that the reactive groups, attached in a pendant manner to the styrenic polymer backbone, can further react with a thermoplastic polymer to form graft type linkages.

The reaction product can also be formed using the styrenic polymer and the grafting agent as recited above in the presence of a free radical catalyst. Amounts employed are conventional amounts of the catalyst suitable to ensure generation of free radicals on the styrenic polymer backbone that react with the ethylenically unsaturated double bond of the grafting agent. Useful free radical catalysts include peroxides such as dialkyl, di, and diacyl peroxides. Other useful free radical catalysts include N-bromoimides dialkylazos and the like.

The reaction product itself is useful as a structural resin. However, it also demonstrates adhesive properties useful for lamination to other polymers, coextrusion with other polymers, metal bonding, and the like.

The reaction product is also a stable product that may be stored for further blending with a second polymer. Alternatively, blending of the functionalized styrenic polymer with the second thermoplastic polymer may take place immediately after its formation to form a blended composite as described herein. Formation of a styrenic polymer/thermoplastic polymer blended composite is achieved by blending the second polymer as described herein with the styrenic polymer, grafting agent, and any other desired additional components. The components may be added together at the same time, or added together in any combination or in any sequential fashion of individual or combined components. However, in the preferred embodiments, the styrenic polymer/grafting agent reaction is first carried out, and the resulting modified styrenic polymer is then combined with the second polymer component to form the styrenic polymer/thermoplastic polymer blend. Desired amounts of rubbery materials may be added at any time to improve the impact resistance. However, it is preferred that these rubbery materials are of the functionalized type and it is also preferred that the rubbers be preblended with the modified styrenic polymer, prior to blending with any second polymer.

Thermoplastic compositions of the invention demonstrate improved toughness and delamination resistance. It should thus be appreciated that they can be made into a wide range of useful articles by conventional molding methods employed in the fabrication of thermoplastic articles, i.e., as molded parts, extruded shapes, e.g., tubing, films, sheets, fibers and oriented fibers, laminates and wire coating. "Molding" means forming an article by deforming the blend in the heated plastic state.

The compositions of this invention are characterized by an outstanding combination of properties, foremost of which is outstanding toughness in view of the quantity of functionalized styrenic polymer present with the second polymer, such as a polyamide. The unusually high toughness provides greater ductility, less sensitivity to scratches and molded in notches, and vastly reduced susceptibility to catastrophic failure when compared with previously known compositions in molded parts. Injection molded parts often are of varying thicknesses and may have scratches, molded-in notches of varying radii, and molded in stresses. In addition, orientation effects may cause varied ductility throughout a molded part the maintenance of high uniform values of notched Izod toughness throughout such molded parts characterizes the improved compositions resistance to brittle breaks. The compositions are of sufficient toughness that the effect of minor changes in processing conditions will not cause significant variations in toughness from lot to lot quantities of composition.

EXAMPLES

The following examples are by way of illustration of certain embodiments of the invention and are not to be construed as limitative thereof.

EXAMPLE 1

A mixture of 97 parts of commercial ABS powder (Blendex 201, Borg-Warner), 3 parts of maleic anhydride was extruded on a corotating, twin-screw extruder (28 mm, Leistritz; L/D=40) with all ten zones of the barrel set at 180° C. At a screw speed of 150 rpm the die pressure was 2,500 psi. The extrudate of maleic anhydride modified ABS was cooled and pelletized. 13.3 parts of the modified ABS pellets were mixed with 26.7 parts of the virgin ABS (Blendex 201 (registered trademark)) and 60 parts of amine terminated nylon 6 (formic acid viscosity =58; [amine] =72 meq g$^{-1}$) and the blend was re-extruded on the twin-screw extruder at 230° C. and a throughput rate of lbs/hr. The blend extrudate was cooled, pelletized and dried.

Pellets of the ABS-nylon blend were injection molded into standard tensile and flexural bars at 220–240° C.

A control example was done under similar conditions with ABS and nylon mechanical blend with no grafting agent present.

For the grafted blend (60/40 ABS-N6), the properties were:

| | |
|---|---|
| Flexural modulus: | 345,000 psi |
| Tensile strength: | 9,700 psi |
| Elongation to break: | 80% |
| Impact energy to break: (@ 12/ft./sec. impact speed) | 56.4 ft. lbs. |
| (Dynatup instrumented impact) Notched Izod: @ 3/16" thickness | 2.1 ft. lbs/in. |
| For the control blend | |
| Flexural modulus: | 342,000 psi |
| Tensile strength: | 9,700 psi |
| Elongation: | 25% |
| Notched Izod: @ 3/16" thickness | 1.8 ft. lbs/in. |
| Impact energy to break (@ 12 ft./sec. impact speed) (Dynatup) | 2.8 ft. lbs/in. |

EXAMPLE 2

This experiment was done with a one-pass operation in the twin-screw extruder with downstream addition of nylon 6 to the modified ABS melt.

49.5 parts ABS powder (Blendex 201(registered trademark)) was mixed with 0.5 parts of maleic anhydride and extruded on a corotating, twin-screw extruder (28 nm, Leistritz) with Zone 1 at 180° C., Zone 2 at 190° C., Zone 3 at 220° C. At Zone 4, set at 220° C, 50 parts of amine terminated nylon 6 (FAV=58; [amine] =72 meq g$^{-1}$) was added. Zones 6–10 were set at 230° C. The extrusion of the melt blend was carried out at a rate of 15.3 lbs/hr and 250 rpm screw speed. The blend extrudate was cooled, pelletized and dried. The dried ABS-nylon 6 blend pellets were injection molded into standard tensile and flexural test bars. A control example was similarly conducted in the absence of grafting agent.

| | Ex. 2 (grafted) | Control (ungrafted) |
|---|---|---|
| Flex. modulus | 337,000 psi | 356,000 |
| Tensile strength | 9,400 | 9,000 |
| Elongation at break (%) | 245 | 28 |
| Notched Izod (ft lbs/in @ 3/16" thickness) | 1.6 | 1.3 |

EXAMPLE 3

44.5 parts of ABS powder, 0.5 parts of maleic anhydride and 0.05 parts of dicumyl peroxide were mixed and extruded on a 28 mm, corotating Leistritz, twin-screw extruder with Zone 1 set at 200° C. Zone 2 at 210° C., Zone 3 set at 240° C. At Zone 4 which was maintained at 235° C., 5 parts of maleated ethylene-propylene rubber (Exxon's MDV 746, ethylene/propylene ratio 47/53; 0.4% maleic anhydride, Mooney viscosity=25) was charged and the blend was extruded with the remaining zones (Zone 5–10 set at 250° C.) at a screw speed of 150 rpm and throughput of 15.6 lbs/hr. This EP rubber blended, maleic anhydride grafted ABS (50 parts) was mixed with 50 parts of amine terminated nylon 6 (FAV=58; [amine]=72 meq g$^{-1}$) and extruded on a 1" single screw extruder (Killion, 4D =30) equipped with Maddox mixing screw at 500° F. 50 rpm and 6.3 lbs/hr. throughput rate. The blended extrudate was cooled, pelletized and dried. The blend pellets were injection molded into standard tensile and flexural test bars. The notched Izod of this ABS-nylon blend was 14.1 ft.lbs/in. (3/16" thick test bars).

| | |
|---|---|
| Flexural modulus: | 288,000 psi |
| Tensile strength: | 8,100 psi |

Elongation to break: 231%

EXAMPLE 4

This experiment was performed on a 28 mm co-rotating twin screw extruder (Leistritz, L/D=40) equipped with an intensive mixing screw and a downstream feed port in the 4th zone.

89 parts of ABS powder (Borg-Warner Blendex 201(registered trademark)) was dry blended with 1 part of maleic anhydride (MA) then extruded on the twin screw extruder with 10 parts maleated ethylene-propylene rubber (Exxon MDV 746, E/P ratio 47/53, 0.4% MA, Mooney viscosity =25) added via the downstream feed port. This mixture was extruded at 250 rpm with a temp profile of 180°, 190°, 220°, 220°, 220°, 230°, 230°, 230°, 230°, 230° C. (Zones 1-10) at a rate of 17.5 lb/hr. The resulting maleated ABS/EPR blend was water cooled and pelletized.

50 parts of dried maleated ABS-EPR blend pellets was extruded on the twin screw extruder with 50 parts of amine terminated nylon 6 (FAV =58, amine equivalents=72 meq/g) added via the downstream feed port. This grafted blend was extruded at 200 rpm with a temp profile of 215°, 250°, 230°, 250°, 250°, 250°, 250°, 250°, 250°, 250° C. (Zones 1-10) at a rate of 22 lb/hr. The resulting ABS/EPR/N6 grafted blend was water cooled and pelletized.

Notched Izod (ft. lb/in) @23° C.=4.34' flex modulus ($10^3$ Psi)=287; flex strength (103 psi)=9.5; tensile modulus ($10^3$ psi)=337; tensile strength ($10^3$ psi)=8.5; elongation at break=122%.

COMPARATIVE EXAMPLE 90 parts ABS powder (Borg-Warner Blendex 201(registered trademark)) was extruded on a 28mm co-rotating twin screw extruder (Leistriz, L/D =40) at 250 RPM with a temp. profile of 180°, 190°, 240°, 195°, 230°, 230°, 230°, 230°, 230°, 220° C. (zones 1-10) at 16 LB/HR with 10 parts maleated ethylene-propylene rubber (Exxon MOV 746, E/P ratio=47/53, 0.4% MA, Mooney viscosity=25) added at the 5th zone. This ABS/EP rubber blend was cooled and pelletized.

50 parts of the AMS/EP rubber blended pellets was dry blended with 50 parts amine terminated nylon 6 (FAV=58, amine equivalents=72 meg/g) and extruded on a 1" single screw extruder (killion KL-100, L/D=30) equipped with a maddox mixing screw. The blend was extruded at 50 RPM, heated at 400°, 500°, 510°, 500° F. (zones 1-4), with a throughput rate of 52g/min. The resulting ABS/N6/EP rubber mixture was cooled and pelletized. After drying the pellets were injection molded into standard flexural and tensile test bars.
RT Notched Izod=3.8 FT-LB/IN
Tensile Strength=8,500 psi
Elongation - 14%

This comparative Example illustrates the need for maleation of the ABS to get a mylon blend product with a high elongation. Maleated EPR in unmaleated ABS does not result in a product with high elongation.

EXAMPLE 5

98 parts of commercial ABS pellets (Borg-Warner, Cycolac L1000) were mixed with 2 parts of maleic anhydride and the mixture was extruded on a one-inch single screw extruder (Wayne L/D=25 to 1) at 225° C. and about 5 lbs/hr throughput rate. The extrudate was water cooled and pelletized. The pellets were dried at 80° C. under vacuum for 15 hrs. The modified ABS (50 parts) was mixed with 50 parts of amine terminated nylon 6 (FAV=58, amine equivalents=72 meq $g^{-1}$) and extruded on the same extruder at 250° C. The resulting ABS-nylon grafted blend was pelletized and dried. The properties of the injection molded blend were. Flexural modulus=296,000 psi; flexural strength=9.900 psi; tensile strength=8,300 psi; tensile elongation at break=220%.

EXAMPLE 6

This experiment was performed on a 1" single screw extruder (Killion KL-100, L/D=30) in three steps. The extruder was equipped with a Maddox mixing screw for each step.

99 parts of Blendex 201 ABS powder (Borg-Warner, 7.1 ft. lb/in notched Izod) was dry blended with 1 part maleic anhydride (MA), then extruded at 40 rpm on the 1" extruder heated to 300°, 350°, 400°, 400° F. (Zones 1-4) at a rate of 25 g/min. This grafted ABS was water cooled and pelletized.

90 Parts of maleated ABS pellets were dry blended with 10 Parts ethylene-ethyl acrylate-maleic anhydride terpolymer (Lotador 8040, CDF chimie) then extruded at 40 rpm on the 1" extruder heated to 400°, 425°, 450°, 450° F. (Zones 1-4) at a rate of 49 g/min. The MA-g-ABS/rubber blend was water cooled and elletized.

50 parts of maleated ABS/rubber blend pellets were dry blended with 50 parts of amine terminated nylon 6 pellets (FAV=58, amine equivalents=72 meq/g) and extruded at 50 rpm on the 1" extruder heated to 400°, 500°, 500°, 500° F. (Zones 1-4) at a rate of 49 g/min. The resulting ABS/rubber/N6 grafted blend (45/5/50) was water cooled and pelletized.

Dried pellets were injection molded into standard tensile and flexural test bars. The following results were obtained: Notched Izod (ft. lb/in) @23° C. =1.6; flex modulus ($10^3$ psi)=298; flex strength =9.6; tensile modulus ($10^3$ psi)=340; tensile strength=8.3; elongation at break=11%.

EXAMPLE 7

This experiment was performed on a 1" single screw extruder (Killion KL-100, L/D=30) in two steps. The extruder was equipped with a Maddox mixing screw for each step.

98.8 Parts of ethylene-propylene rubber grafted SAN copolymer (OSA, Rovel 701(registered trademark), Dow) lightly coated with mineral oil (1%) then dry blended with 1 part maleic anhydride (MA) and 0.2 parts dicumyl peroxide (DCP). This mixture was extruded at 40 rpm on the 1" extruder heated to 300°, 350°, 400°, 400° F. (Zones 1-4) at a rate of 40 g/min. The resulting grafted Rovel strand was water cooled and pelletized.

50 parts of the dried maleated OSA pellets were dry blended with 50 parts of amine terminated nylon 6 pellets (FAV=58, amine equivalents=72 meq/g) and extruded at 50 rpm on the 1" extruder heated to 450°, 500°, 500°, 500° F. (Zones 1-4) at a rate of 45 g/min. The resulting OSA/nylon grafted blend was water cooled and pelletized (A).

A blend without the peroxide initiator (DCP) was prepared in the same fashion. Pellets of both blends were dried then injection molded into standard tensile and flexural test bards (B).

The following results were obtained:

|  | 7A | 7B |
|---|---|---|
| RT Notched Izod (ft. lb/in) | 2.2 | 0.5 |
| Tensile Strength ($10^3$ psi) | 8.3 | 7.7 |
| Elongation at Break | 107% | 4% |

EXAMPLE 8

This experiment was performed on a 1" single screw extruder (Killion KL-100, L/D=30) in three steps. The extruder was equipped with a Maddox mixing screw for each step.

98.9 parts of Mobil 5600 high impact polystyrene (HIPS) was lightly coated with mineral oil ( 1%) then dry blended with 1 part maleic anhydride (MA) and 0.1 Part dicumyl peroxide (DCP). This mixture was extruded at 50 rpm on the 1" extruder, heated to 300°, 330°, 400°, 210° F. (Zones 1-4) at a rate of 23 g/min. The resulting grafted HIPS strand was water cooled and pelletized.

90 parts of the dried maleated HIPS pellets were dry blended with 10 parts maleated ethylene-propylene rubber (Exxon MDV 746, E/P ratio=47/53, 0.4% MA, Mooney viscosity=25) then extruded at 40 rpm on the 1" extruder heated to 400°, 425°, 450°, 460° F. (Zones 1-4) at a rate of 42 g/min. The resulting maleated HIPS-/EP rubber blend was water cooled and pelletized.

50 parts of dried maleated HIPS/EPR blend pellets was dry blended with 50 parts of amine terminated nylon 6 pellets (FAV=58, amine equivalents =72 meq/g) and extruded at 50 rpm on the 1" extruder heated 400°, 500°, 500°, 500° F. (Zones 1-4) at a rate of 50 g/min. The resulting HIPS/EPR N6 grafted blend (45/5/50) was water cooled and pelletized (#8A).

A blend without the peroxide initiator (DCP) was prepared in the same fashion (#8B). Pellets of both blends were dried then injection molded into standard tensile and flexural test bards. The following results were obtained:

|  | 8A | 8B |
|---|---|---|
| Notched Izod (ft. lb./in) @ 23° C. | 1.5 | 0.5 |
| Flex Modulus ($10^3$ psi) | 257 | 242 |
| Flex Strength | 8.0 | 6.1 |
| Tensile Modulus ($10^3$ psi) | 289 | 267 |
| Tensile Strength | 6.6 | 4.6 |
| Elongation at Break | 18% | 2% |

EXAMPLE 9

97.2 parts of ABS powder (Blendex 201, Borg-Warner) was mixed with 0.1 parts of dicumyl peroxide and extruded on a 1" single screw extruder (Killion), while simultaneously injecting into the molten ABS, 2.7 parts of 1:1 mixture of styrene and N-methacryloyl caprolactam via a liquid injector assembly attached to the extruder at approximately the middle portion of the screw. The liquid injector consisted of a single piston, a precision metering pump (Model A-30-S, Elder laboratories, San Carlos, Calif.) with a nominal flow rate range of 0.05-1.5 ml/min and a maximum pressure rating of 5000 psi. The temperatures of Zones 1 to 4 of the extruder were maintained at 177° C., 205° C., 230° C. and 230° C. respectively. The overall throughput rate of the extrudate was about 30 g/min. The extrudate consisting of functionalized ABS was cooled, pelletized and dried.

50 parts of the functionalized ABS was mixed with 50 parts of amine terminated nylon 6 (FAV =58) and extruded on the same extruder at 260° C. at a throughput rate of 42 g/min. The ABS-nylon blend extrudate was cooled, pelletized and dried. The dried blend product was injection molded into standard ASTM tensile and flexural bars.

RT Notched Izod=2.1 FT-LB/IN
Tensile Strength=8,600 PSI
Elongation=15%

EXAMPLE 10

This experiment was carried out on a 28 mm co-rotating, twin screw extruder (Leistritz, 40=40) equipped with a modified mixing screw and a downstream feed Port in the 7th zone.

44.5 parts of ethylene-propylene rubber grafted SAN copolymer (OSA, Rovel 701(registered trademark), Dow) and 5 parts maleated ethylene-propylene rubber (Exxon MDV 746, E/P ratio 47/53, 0.4% MA, Mooney viscosity=25), lightly coated with mineral oil (1%), were dry blended with 0.4 parts maleic anhydride and 0.1 parts dicumyl peroxide. This mixture was extruded at 150 rpm with a temp profile of 200°, 235°, 250°, 220°, 240° C. (Zones 1-5), 250° C. (Zones 6-10) at a rate of 15 lb/hr with 50 parts amine terminated nylon 6 (FAV=58, amine equivalents=72 meq/g) added via the downstream feed port. The resulting OSA/nylon 6 grafted blend was cooled and pelletized. The blend pellets were dried and injection molded into ASTM standard test bars. The RT notched Izod ($\frac{1}{4}$" thick) was 14.4 ft. lb/in; tensile strength was 7,700 psi, elongation at break was 133%; flexural modulus was 281,000 psi.

EXAMPLE 11

A. This example illustrates the use of graft coupling agents for ABS-PET blend.

99 parts of polyethylene terephthalate (I.V.=0.68; [carboxyl]=0.034 meq./g$^{-1}$) was mixed with 1 part of m-Phenylene bisoxazoline (Takeda, Japan) and extruded at 250° C. on a co-rotating twin-screw extruder (28 mm, Leistritz) at 21 lbs/hr throughput rate. The resulting product was PET whose carboxyl groups were essentially capped with oxazoline moiety ( [carboxyl]=0.004 meqg$^{-1}$) 50 parts of these 'modified' PET pellets were mixed with 50 parts maleated ABS (from example 1) and extruded on the same twin-screw extruder at 230° C. at 12.5 lbs/hr throughput rate. The blend extrudate was pelletized, dried and injection molded into standard tensile and flexural bars.

B. A control blend was made by melt blending a mixture of 50 parts of unmodified ABS and unmodified PET (0.68 I.V.) and extruding under similar conditions.

|  | 11A | 11B |
|---|---|---|
| Notched Izod (ft lbs/In) | 1.3 | 0.9 |
| Tensile Modulus ($10^3$ psi) | 317 | 321 |
| Tensile Strength ($10^3$ psi) | 8 | 8 |
| Elongation at break (%) | 36 | 20 |

EXAMPLE 12

A. A powder-pellet mixture of two types of ABS, Blendex 201 and cycolac GSM 1000 (3:1 ratio) was fed into the throat of a 1" Killion extruder equipped with a liquid injection port. 2-isopropenyl oxazoline (Dow) was injected into the melt of ABS at a rate of 1.75g/min while the ABS was extruded at a rate of 25g/min. The melt temperatures were maintained between 240° C.-260° C., while die pressure of 300 psi was noted at a screw speed of 50 rpm. The modified ABS was cooled and pelletized and dried. PET (I.V.=0.7) was melt blended with 4 wt% of low molecular weight ethylene-acrylic acid copolymer neutralized with sodium (Aclyn Ionomer wax, Allied) added as a preferred nucleator for PET. This nucleated PET was prepared in a single screw extruder, pelletized and dried. 50 parts of nucleated PET was mixed with 50 parts of the oxazoline-modified ABS and extruded on 1" killion extruder while maintaining melt temperatures between 240° C.-260° C. The extruded blend was cooled, pelletized and dried.

B. A control blend was prepared with the same nucleated PET with unmodified ABS under similar conditions. The two blends were injection molded at a melt temperature of 225° C. and mold temperature of 40° C. into standard tensile and flexure bars. The samples were then annealed at 160° C. for 4 hours and the following properties were obtained:

|  | 12A | 12B (Control) |
| --- | --- | --- |
| Tensile Strength ($10^3$ psi) | 8.06 | 6.01 |
| Tensile Modulus ($10^3$ psi) | 352 | 333 |
| Elongation (%) | 2.5 | 1.8 |
| Izod Impact (Unnotched) (ft lbs/In) | 3.2 | 1.5 |

EXAMPLE 13

This experiment was performed on a 28 mm co-rotating twin screw extruder (Leistritz, L/D=40) equipped with an intensive mixing screw and a downstream feed port in the 4th zone.

50 parts of ABS Powder (Borg-Warner Blendex 201(registered trademark)) was dry blended with 1 part of maleic anhydride (MA) then extruded on the twin screw extruder with 50 parts maleated ethylene-propylene rubber (Exxon MDV 746, E/P ratio 47/53, 0.4% MA, Mooney viscosity=25) added via the downstream feed port. This mixture was extruded at 250 rpm with a temp profile of 180°, 190°, 220°, 220°, 220°, 230°, 230°, 230°, 230°, 230° C. (Zones 1-10) at a rate of 17.5 lb/hr. The resulting maleated ABS/EPR blend was water cooled and pelletized.

50 parts of dried maleated ABS-EPR blend pellets were extruded on the twin screw extruder with 50 parts of polyethylene terephthalate added via the downstream feed port. This blend was extruded at 200 rpm with a temp profile of 215°, 250°, 230°, 250°, 250°, 250°, 250°, 250°, 250°, 250° C. (Zones 1-10) at a rate of 22 lb/hr. The resulting ABS/EPR/PET blend was water cooled and pelletized.

The results are below.

| | |
| --- | --- |
| Notched Izod (ft. lbs./in.) | 0.8 |
| Tensile Modulus ($10^3$ psi) | 203 |
| Ultimate Tensile Strength ($10^3$ psi) | 4.4 |
| Elongation at Break (%) | 11 |

EXAMPLE 14

A mixture of 45 parts of ABS powder (Borg-Warner Blendex 131 (registered trademark)), 45 parts of polyethylene terephthalate, and 10 parts of ethylene/ethylacrylate/glycidyl methacrylate terpolymer was fed together and extruded on a 28 mm co-rotating twin screw extruder (Leistritz, L/D=40) equipped with an intensive mixing screw and a downstream feed port in the 4th zone.

This mixture was extruded at 250 rpm with a temp profile of 180°190°, 220°, 220°, 220°, 230°, 230°, 230°, 230°, 230° C. (Zones 1-10) at a rate of 17.5 lb/hr. The resulting ABS/PET/E-EA-GMA blend was water cooled and pelletized.

The results are below:

| | |
| --- | --- |
| Notched Izod (ft. lbs./in.) | 1.2 |
| Tensile Modulus ($10^3$ psi) | 208 |
| Ultimate Tensile Strength ($10^3$ psi) | 4.9 |
| Elongation at Break (%) | 19 |

EXAMPLE 15

This experiment was performed on a 28 mm co-rotating twin screw extruder (Leistritz, L/D=40) equipped with an intensive mixing screw and a downstream feed port in the 4th zone.

44 parts of polyethylene terephthalate were extruded on the twin screw extruder with 11 parts of ethylene/ethylacrylate/glycidyl methacrylate terpolymer added via the downstream feed port. This mixture was extruded at 250 rpm with a temp profile of 180°, 190°, 220°, 220°, 220°, 230°, 230°, 230°, 230°, 230° C. (Zones 1-10) at a rate of 17.5 lb/hr. The resulting maleated PET/E-EA-GMA terpolymer blend was water cooled and pelletized.

45 parts of dried PET/E-EA-GMA terpolymer blend pellets were extruded on the twin screw extruder with 45 parts of ABS powder (Borg-Warner Blendex 131(registered trademark)) added via the downstream feed port. This grafted blend was extruded at 200 rpm with a temp profile of 215°, 250°, 230°, 250°, 250°, 250°, 250°, 250°, 250°, 250° C. (Zones 1-10) at a rate of 22 lb/hr. The resulting PET/E-EA-GMA/ABS blend was water cooled and pelletized.

The results are below:

| | |
| --- | --- |
| Notched Izod (ft. lbs./in.) | 1.3 |
| Tensile Modulus ($10^3$ psi) | 200 |
| Ultimate Tensile Strength ($10^3$ psi) | 4.8 |
| Elongation at Break (%) | 34 |

EXAMPLE 16

This experiment was performed on a 28 mm co-rotating twin screw extruder (Leistritz, L/D=40) equipped with an intensive mixing screw and a downstream feed port in the 4th zone.

44 parts of ABS powder (Borg-Warner Blendex 131(registered trademark)) were extruded on the twin screw extruder with 11 parts of ethylene/ethylacrylate/glycidyl methacrylate terpolymer added via the downstream feed port. This mixture was extruded at 250 rpm with a temp profile of 180°, 190°, 220°, 220°, 220°, 230°, 230°, 230°, 230°, 230° C. (Zones 1-10) at a rate of 17.5 lb/hr. The resulting ABS/E-EA-GMA terpolymer blend was water cooled and pelletized.

55 parts of dried ABS/E-EA-GMA terpolymer blend pellets were extruded on the twin screw extruder with 45 parts of polyethylene terephthalate added via the downstream feed port. This grafted blend was extruded at 200 rpm with a temp profile of 215°, 250°, 230°, 250°, 250°, 250°, 250°, 250°, 250°, 250° C. (Zones 1-10) at a rate of 22 lb/hr. The resulting ABS/E-EA-GMA/PET blend was water cooled and pelletized.

The results are below:

| | |
|---|---|
| Notched Izod (ft. lbs./in.) | 1.6 |
| Tensile Modulus ($10^3$ psi) | 200 |
| Ultimate Tensile Strength ($10^3$ psi) | 4.8 |
| Elongation at Break (%) | 100 |

EXAMPLE 17

This experiment was performed on a 28 mm co-rotating twin screw extruder (Leistritz, L/D=40) equipped with an intensive mixing screw and a downstream feed port in the 4th zone.

44 parts of ABS powder (Borg-Warner Blendex 201(registered trademark)) were dry blended with 1 part of maleic anhydride (MA) then extruded on the twin screw extruder with 11 parts of ethylene/ethylacrylate/glycidyl methacrylate terpolymer added via the downstream feed port. This mixture was extruded at 250 rpm with a temp profile of 180°, 190°, 220°, 220°, 220°, 230°, 230°, 230°, 230°, 230° C. (Zones 1-10) at a rate of 17.5 lb/hr. The resulting maleated ABS/E-EA-GMA blend was water cooled and pelletized.

55 parts of dried maleated ABS/E-EA-GMA blend pellets were extruded on the twin screw extruder with 45 parts of polyethylene terephthalate added via the downstream feed port. This grafted blend was extruded at 200 rpm with a temp profile of 215°, 250°, 230°, 250°, 250°, 250°, 250°, 250°, 250°, 250° C. (Zones 1-10) at a rate of 22 lb/hr. The resulting ABS/EPR/N6 grafted blend was water cooled and pelletized.

The results are below:

| | |
|---|---|
| Notched Izod (ft. lbs./in.) | 3.1 |
| Tensile Modulus ($10^3$ psi) | 200 |
| Ultimate Tensile Strength ($10^3$ psi) | 4.8 |
| Elongation at Break (%) | 104 |

Having described the invention in detail and by reference to preferred embodiments thereof, it will be apparent that modifications and variations are possible without departing from the scope of the invention defined in the appended claims.

What is claimed is:

1. A blended composition comprising (a) modified styrenic polymer wherein said modified styrenic polymer comprises the reaction product of polybutadiene modified styrene acrylonitrile resin with an ethylenically unsaturated grafting agent, said grafting agent being maleic anhydride and said modified styrenic polymer containing the acid anhydride groups of said maleic anhydride as pendant reactive functionalities and (b) polyester.

2. The blended composition of claim 1 wherein said polyester is polyethylene terephthalate.

3. The blended composition of claim 1 wherein said polyester is poly(butylene terephthalate).

4. The blended composition of claim 1 wherein said polyester is poly(1,4-cyclohexane dimethylene terephthalate).

5. The blended composition of claim 2 wherein said polyethylene terephthalate is mixed with m-phenylene bisoxazoline.

6. The blended composition of claim 1 which additionally comprises an ethylene copolymer rubber.

7. The blended composition of claim 6 wherein said rubber is functionalized ethylene copolymer.

8. The blended composition of claim 7 wherein said functionalized ethylene copolymer is functionalized ethylenepropylene rubber.

9. The blended composition of claim 8 wherein said functionalized ethylene-propylene rubber is functionalized with maleic anhydride.

10. The blended composition of claim 6 wherein said rubber is ethylene/ethylacrylate/glydicyl methacrylate terpolymer.

11. The blended composition of claim 6 wherein said rubber is ehtylene/glycidyl methacrylate.

* * * * *